No. 651,007. Patented June 5, 1900.
F. DANKS.
MACHINE FOR MAKING RIVETS.
(Application filed Apr. 1, 1899.)

(No Model.) 6 Sheets—Sheet 1.

Witnesses
Geo. A. Darby.
Charles S. Brintnall

Inventor
Frank Danks
by W. E. Hagan atty

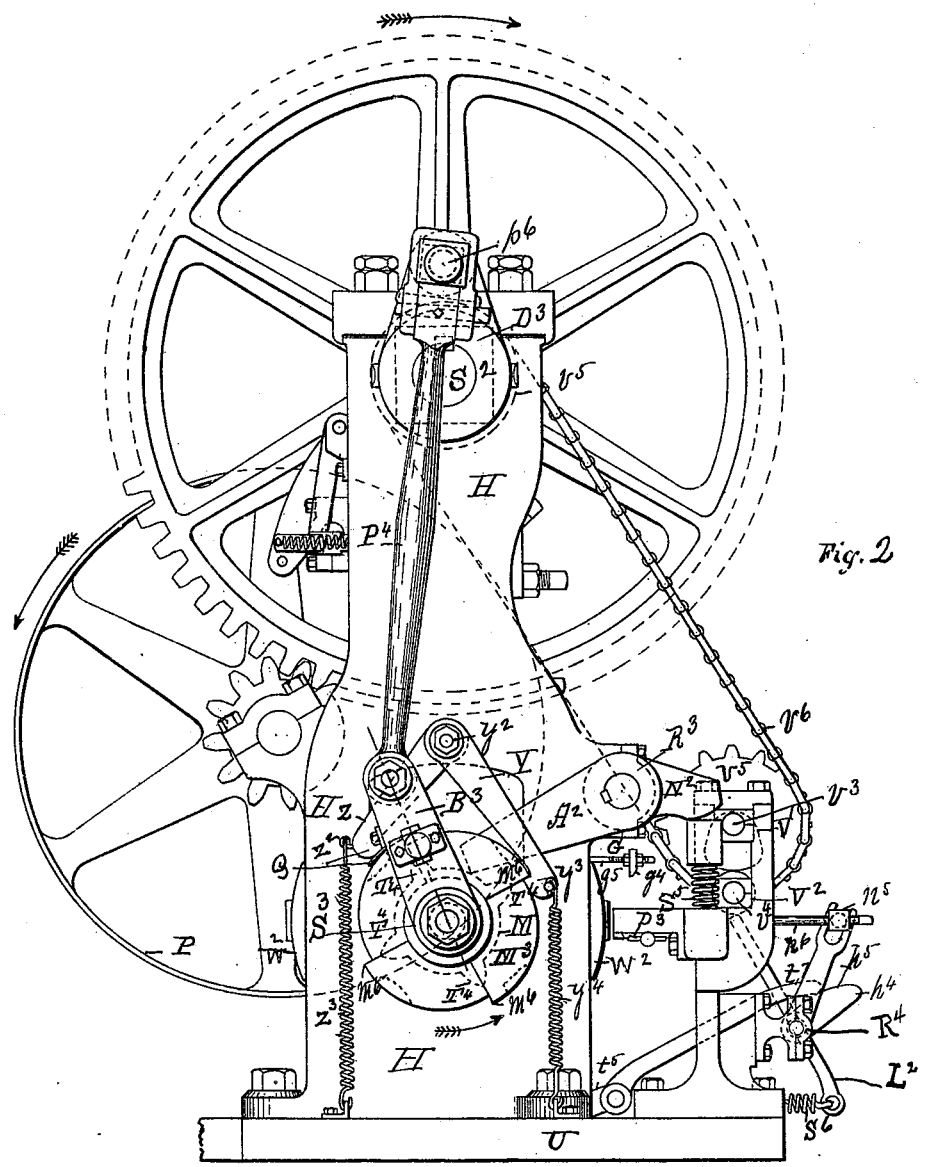

No. 651,007.  
Patented June 5, 1900.
F. DANKS.
MACHINE FOR MAKING RIVETS.
(Application filed Apr. 1, 1899.)
(No Model.)  
6 Sheets—Sheet 3.
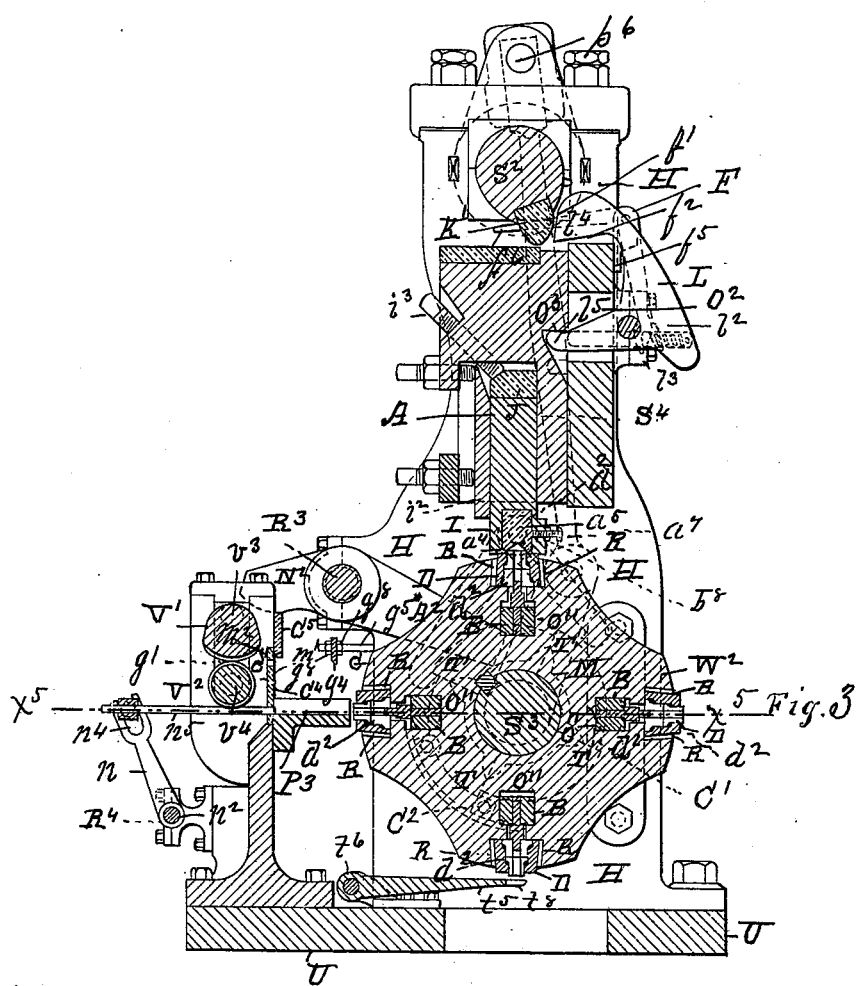

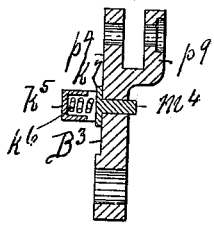
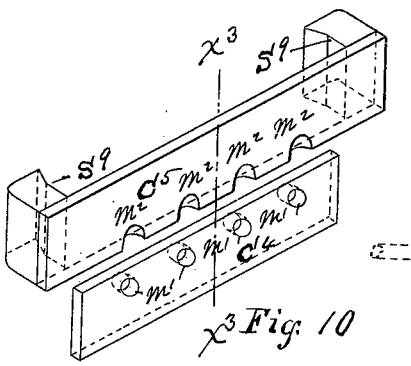
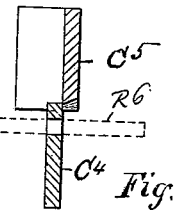
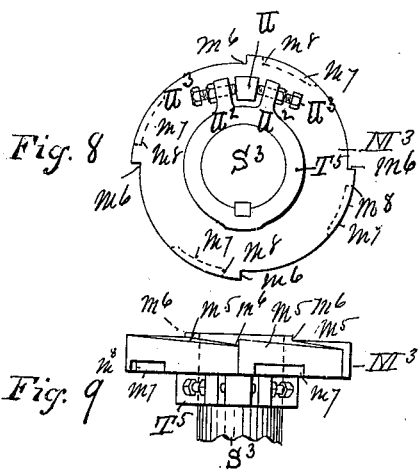
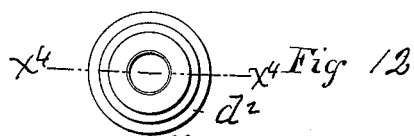
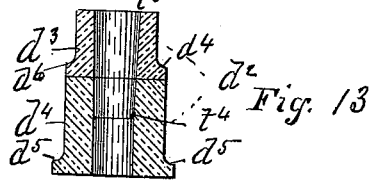
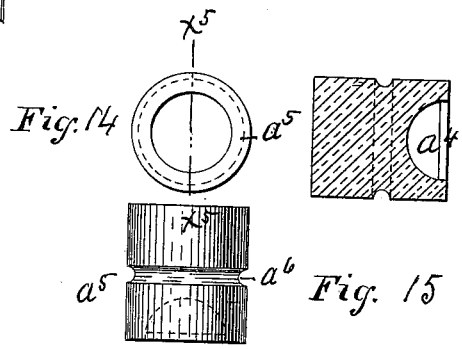

No. 651,007. Patented June 5, 1900.
F. DANKS.
MACHINE FOR MAKING RIVETS.
(Application filed Apr. 1, 1899.)
(No Model.) 6 Sheets—Sheet 6.

Witnesses
Geo. A. Darby.

Inventor
Frank Danks

UNITED STATES PATENT OFFICE.

FRANK DANKS, OF TROY, NEW YORK.

MACHINE FOR MAKING RIVETS.

SPECIFICATION forming part of Letters Patent No. 651,007, dated June 5, 1900.

Application filed April 1, 1899. Serial No. 711,353. (No model.)

*To all whom it may concern:*

Be it known that I, FRANK DANKS, of the city of Troy, county of Rensselaer, and State of New York, have invented new and useful Improvements in Machines for Making Rivets, of which the following is a specification.

My invention relates to machines for making rivets, and more particularly to improvements upon the machine for that purpose for which Letters Patent were granted me November 25, 1890, No. 441,229. These improvements relate to a means for adapting the mechanism illustrated in said Letters Patent for making rivets of differing lengths and sizes, also to an improved means for feeding the blanks to the dies, and an improved mechanism for operating the header in which the header-dies are placed, all of which will be more fully set forth hereinafter in the claims.

Accompanying this specification to form a part of it there are six plates of drawings, containing eighteen figures, illustrating the application of my invention, with the same designation of parts by letter reference used in all of them.

Figure 1:
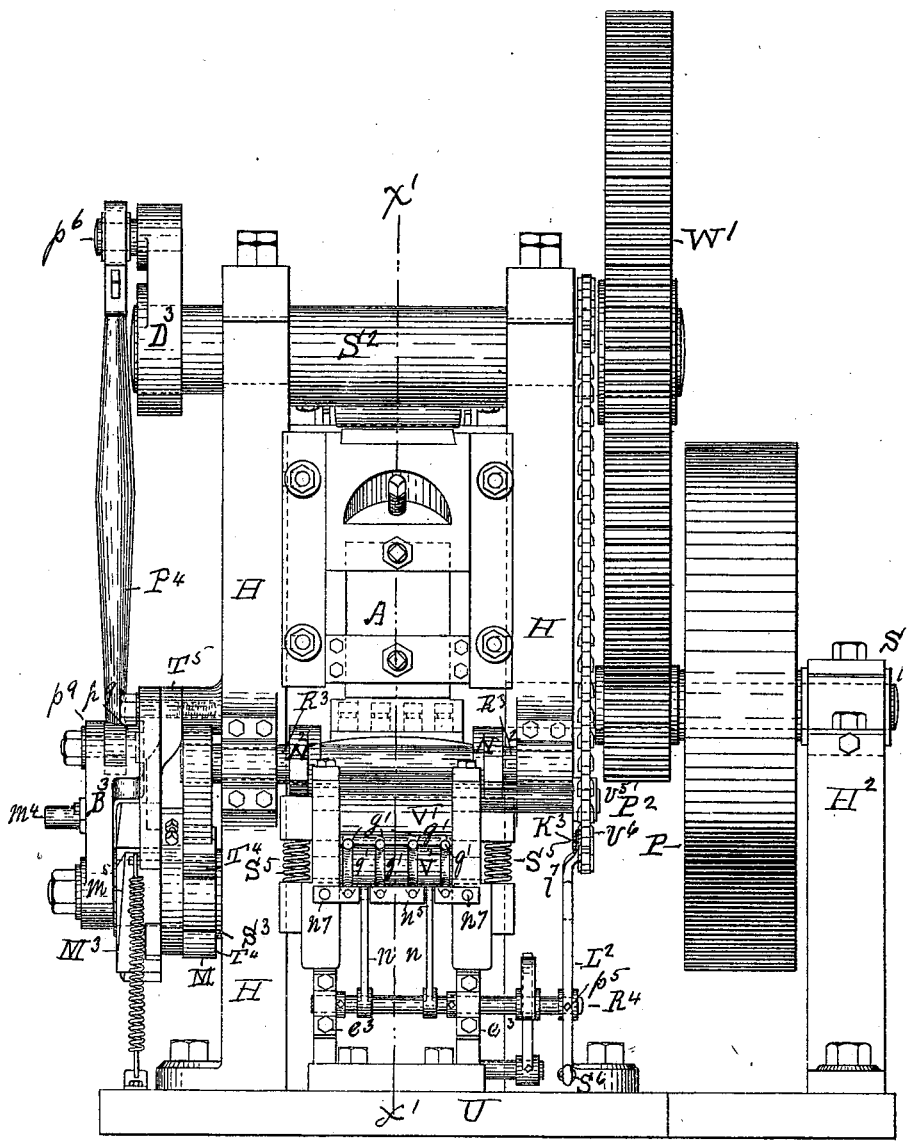
Figure 6:
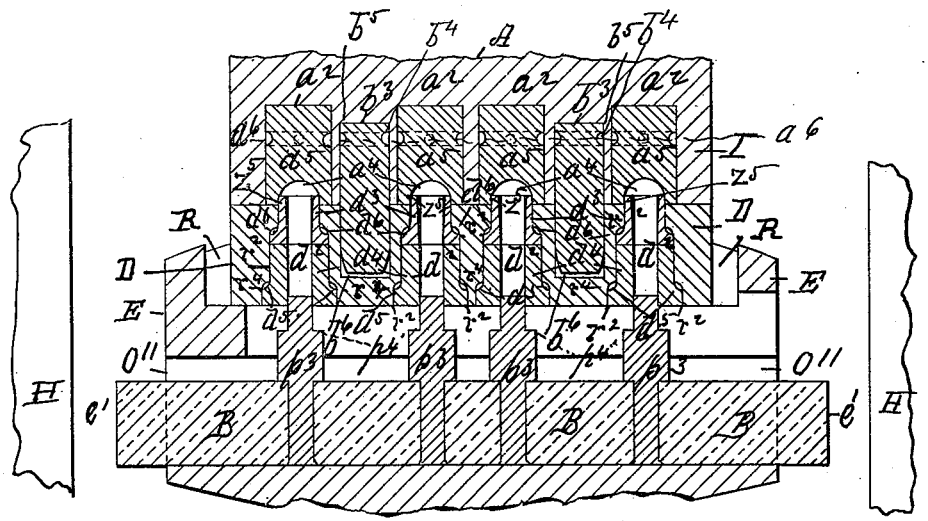
Figures 4, 5:
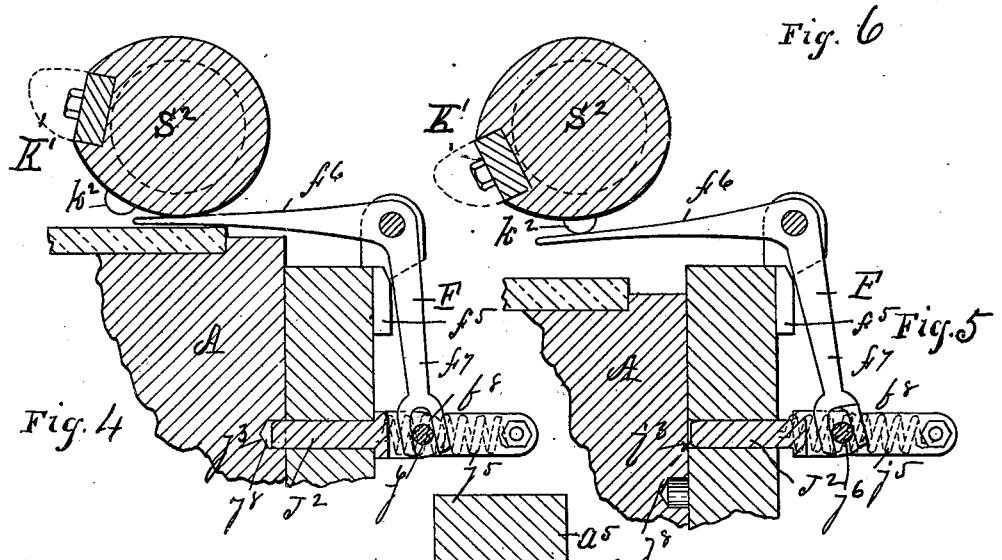
Figure 17:
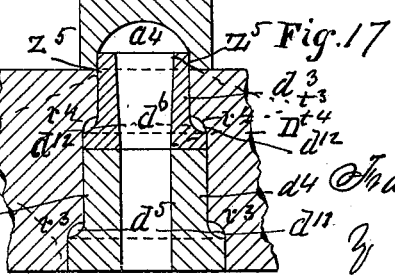
Figure 18:
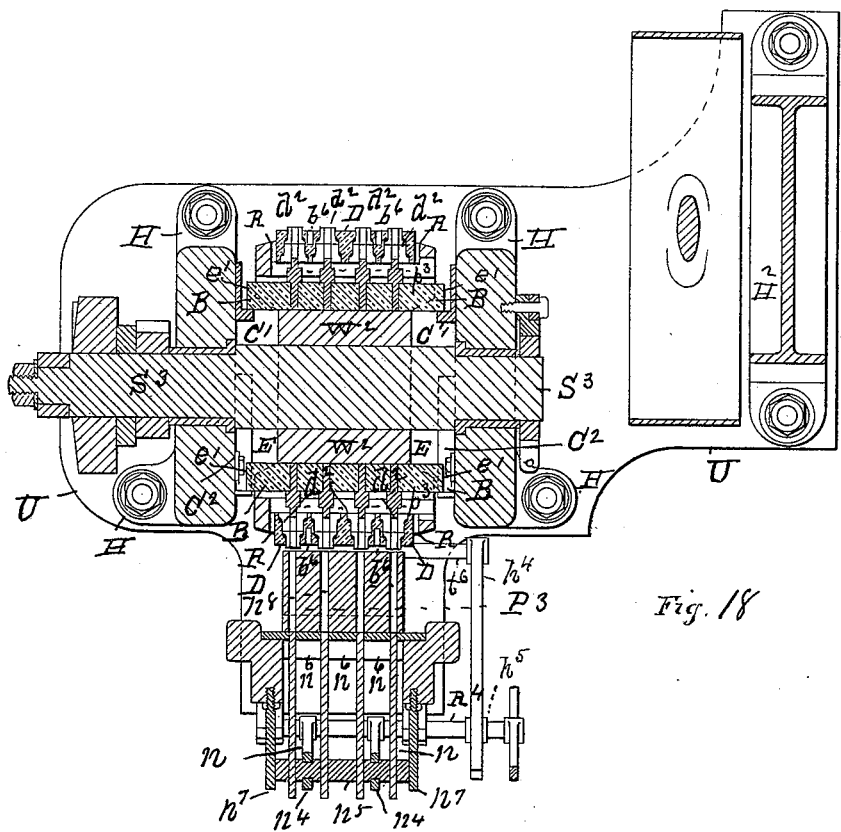

Of the illustrations, Figure 1 is a front elevation of a rivet-making machine containing my invention and improvements. Fig. 2 is a side elevation of the machine shown at Fig. 1, with that one of its sides which is opposite to that at which power is applied illustrated as facing the view and having the side extension of the frame or housing wherein the outer end of the driving-shaft journals broken out. Fig. 3 is a vertical section taken through the die-wheel, die-sinks, stocks, dies, blanks, notches in the cutter-blades, and through one of the grooves in the platen and at right angles to the axle of the die-wheel. Fig. 4 is a vertical section of a part of the header and illustrating the mechanism by which the header is locked when it is raised. Fig. 5 is another section of the same parts that are illustrated at Fig. 4, but with the header shown as unlocked. Fig. 6 is a section taken from side to side through a part of the die-wheel, centrally through the die holder or stock and dies of the die-wheel, the header, the header-die holder, header-dies, and the rivet-ejector and its pins by which the finished rivets are removed from the dies, together with a broken-out part of the machine-housing at each end of the die-wheel. Fig. 7 is a section taken on the line $x^2 x^2$ of Fig. 2. Fig. 8 is a rear view of the ratchet-wheel, of the die-wheel shaft, and the time-ring thereon. Fig. 9 is an edge view of the ratchet-wheel and time-ring of the die-wheel shaft, showing also a part of the latter. Fig. 10 is an isometrical perspective of the shearing-blades by which the blanks are cut from the entered rods. Fig. 11 is a section taken on the line $x^3 x^3$ of Fig. 10. Fig. 12 is a top view of one of the die-wheel dies, in which latter the shanks of the rivets are shaped. Fig. 13 is a section taken on the line $x^4 x^4$ of Fig. 12. Fig. 14 is a bottom view of one of the header-dies by which the heads of the rivets are swaged into shape. Fig. 15 is a side elevation of one of the header-dies, and Fig. 16 is a section taken on the line $x^5 x^5$ of Fig. 15. Fig. 17 is a vertical section of one of the header-dies and a part of one of the die-holders and one of the dies. Fig. 18 is a transverse section taken on the line $X^5 X^5$ of Fig. 3.

The several parts of the mechanism thus illustrated are designated by letter reference, and the function of the parts is described as follows:

The frame or housing in which the mechanism is mounted is designated at H, and it is provided with a supporting-base U and an offset $H^2$. The driving-shaft is designated at S', and it is arranged to journal at one of its ends in the offset-housing and at its other end in the housing proper. The driving-pulley P is mounted upon the driving-shaft inside of where it journals in the offset-housing, and between the pulley P and the housing proper there is mounted upon the driving-shaft the pinion $P^2$.

The letter $S^2$ designates another shaft having its bearings in the top of the housing proper, and where extending laterally beyond the latter there is mounted upon this last-named shaft the gear-wheel W', arranged to mesh into and receive power from the pinion $P^2$ on the driving-shaft.

The letters $S^3$ designate a shaft having bearings in the housing proper and having mounted thereon a die-wheel $W^2$, adapted to turn with it. There are four recesses R formed in the die-wheel exterior at diametrically-opposite points, with the horizontal center of these recesses arranged to be parallel to the axis of the die-wheel shaft. Each of these recesses R is formed to receive a die-holder D, that is detachably arranged therein, and each of the latter has interiorly formed in it a series of sinks $r^2$, arranged to be in line with each other and to have their horizontal centers parallel to the axis of the die-wheel shaft. These sinks $r^2$ are each constructed with an encircling shoulder $r^3$ and an inner encircling shoulder $r^4$, and they are each formed to receive one of the dies $d^2$, of which there is one shown as detached at Fig. 13 and one shown in connection with one of the header-dies, part of one of the die-wheel die-holders, and one of the rivet-dies at Fig. 17 and with the parts in position at Fig. 6. Each of the dies $d^2$ is made in two parts—an outer part (designated at $d^3$) and an inner part (indicated at $d^4$,) the latter having formed therein an encircling shoulder $d^5$, arranged to come opposite to, but not to be in contact with, the shoulder $r^3$, formed on that one of the sinks $r^2$ in which the die part $d^4$ is located.

The letter $d^6$ designates a shoulder formed in each of the die parts $d^3$, each arranged to come opposite to, but not in contact with, the shoulder $r^4$ of that one of the sinks $r^2$ in which the die part $d^3$ is located. As thus made there will be a space $d^{11}$ between the shoulder $d^5$ of the die part $d^4$ and the shoulder $r^3$ of the sink and a space $d^{12}$ between the shoulder $d^6$ or the die parts $d^3$ and the shoulder $r^4$ of the recess, in which place these spaces $d^{11}$ and $d^{12}$ are formed to adapt the dies to adjust themselves and to prevent expansion from heat interfering with their work.

The die parts $d^3$ and $d^4$, by which the shanks of the rivets are shaped, are made to taper inwardly slightly, as is shown between the letters $t^3$ and $t^4$ at Figs. 13 and 17, it being the purpose of so shaping them to better adapt them to enter the holes in which they are to be clenched.

The header is designated at A and the header die-holder at I. This die-holder has recesses formed in what is its under side when in position for use in the machine, and these recesses are designated at $a^2$ and arranged to be in line with each other in the die-holder I and where within the latter to be centrally in line with the axis of the die-wheel shaft. Each of these recesses $a^2$ is provided with a rivet-heading die, (designated at $a^3$,) and each of which has in its bottom face a concave recess $a^4$, which by compression upon the outer end of the blanks within the dies $d^2$ will form the heads thereon. This concave recess in each of the header-dies is constructed to extend over the top and to make a shearing engagement at $z^5$ with the outer face of each of the die parts $d^4$ to cut from the rim of the head any fin or excrescence that may have been formed thereon. These header-dies are each connected within one of the recesses $a^2$ in the stock I by means of the encircling groove $a^6$, formed in the die exterior, and a set-screw $a^7$, threaded into and through the stock or holder I, with the inner end of the set-screw within the groove $a^6$, formed in the die. As thus constructed dies of differing sizes may be used in the same holders or stock I.

The letters $b^3$ designate steady-pins or guide-bars, each of which is arranged in a recess $b^5$ in the under surface of the stock or die-holder I, of which recesses there are two. Each of these steady-pins or guide-bars $b^3$ is provided with an encircling groove $b^4$, formed to encircle the upper part of the bar, and a set-screw $b^8$, threaded into and through the stock or die-holder I to enter the groove $b^4$ in each of the bars $b^3$, one of the set-screws thus placed being shown at Fig. 3.

The letters $b^6$ designate slideways formed in the die stock or holder D between the sinks $r^2$, each of which slideways is adapted to receive and steadily direct downwardly one of the bars or pins $b^3$ when the stock or die-holder I is descending, and thus secure to the latter accuracy and steadiness of movement.

Within the die-wheel at four diametrically-opposite points there is arranged within a horizontal passage-way $O^{11}$ a bar B, with each of said passage-ways arranged inside of and diametrically in line with one of the recesses R and holders D, with the ends $e'$ $e'$ of each of said bars extending beyond the ends E E of the die-wheel.

The letters $p^3$ designate pins that are projected from the outer side of each of the bars B, with each of said pins $p^3$ at its end and where extending beyond its shoulder $p^4$ being arranged to pass through a slot formed in the bottom of each of the recesses R to enter one of the dies $d^2$, on the outer ends of which pins thus entered the inner ends of the blanks rest while being headed.

When the die-wheel is being revolved with four alternating periods of motion and rest, as will be hereinafter more fully described, and the projecting ends $e'$ $e'$ of the bar B come in contact with the stationary cam C', of which there is one on each side of the inner ends of the housing, the bar and pins are forced outwardly, the pins as so operated forcing the rivets from the dies $d^2$. These cams C' are indicated by dotted lines at Fig. 3 and by full lines at Fig. 18. As the wheel continues to revolve the outer projecting ends $e'$ $e'$ of the bar B will engage with the cam $C^2$, of which there is one on the inner side of the housing at each end of the die-wheel, and by which last-named engagement of the bar B the latter and the pins $p^3$ are forced into a position for the insertion of another series of blanks. One of these cams is shown in dotted lines at Fig. 3 and in full lines at Fig. 18.

The header (designated at A) is arranged to vertically move in slideways $S^4$, connected to the housing sides, and the header-die holder or stock is secured within the interior $i^2$ of the header by means of bolts, and the relative position of the header-dies to the die-wheel dies, as to the descending distance of the header-dies, is regulated by means of screw-bolt $i^3$, arranged to bear upon the stop-bar J, arranged in the header interior $i^2$.

The header (designated A) is arranged to be raised and latched and then tripped to descend by gravity and immediately thereafter to be forced downwardly by a swaging effort, with these successive operations repeated every time the die-wheel brings into position beneath the header the dies loaded with blanks. The mechanism by which the header is thus operated is described as follows:

The letter L designates a bell-crank lever which at its angle $l^2$ is pivoted to a bracket $l^3$, projected from the housing. This lever L at its upper end is constructed with a beak $l^4$, having the cam-surfaces $f'$ $f^2$, and at its lower end this lever is provided with a horizontally-projected foot $l^5$. When the shaft $S^2$ is revolving and the cam designated at $K'$ comes in contact with the end $f'$ of the beak, it operates the lever L in such a manner that its foot $l^5$ will pass through the opening $O^2$ to enter the angular recess $O^3$, and when the cam $K'$ has passed from off the face $f'$ to engage with the under face of the beak the cam operates the lever L to raise the header A in its slideways. This header as thus raised is latched or stopped so as to hold it as thus raised, and tripped to have it descend by gravity by a mechanism described as follows:

The letter F designates another bell-crank lever, which at its angle is pivoted to a bracket $f^5$, projected from the rear side of the machine-housing. The lever F has a horizontally-placed top arm $f^6$ and a vertically-depending arm $f^7$, which latter at its lower end is forked at $f^8$.

The letter $J^2$ designates a horizontally-arranged latch or stop-pin arranged in a slideway $j^3$, formed in the rear wall of the machine-frame, back of the header A, and at its outer end this stop-pin is encircled by a helical spring $j^5$.

The letter $j^6$ designates a pin projected from the exterior of the tube $j^4$, which pin is arranged to enter the forked end of the depending arm of the lever, (indicated at $f^8$.)

The letter $j^8$ designates a recess formed in the rear wall of the header at such a position therein relatively to the stop-pin $J^2$ that when the header is raised to reach the limit of its upward movement this stop-pin will be forced to enter the recess $j^8$ and thus latch and hold the header as raised. As the shaft $S^2$ in revolving causes its pin $K^2$ to come in contact with the arm $f^6$ of the bell-crank lever F it operates the depending arm $j^7$ to move outwardly the stop-pin, when the header A, thus released, will descend by gravity. The construction of the stop-pin $J^2$ and the bell-crank lever F is shown at Figs. 4 and 5.

The blanks from which the rivets are formed are cut from the ends of rods which have been heated and are moved to enter the mechanism by means of the feed-rollers, which are circumferentially grooved in vertical alinement with one of the feed-rollers mounted eccentrically on its shaft, whereby its perimeter will come in contact with that of the other roller to move the rods at regularly-intermitting periods. When being moved inwardly, the length of the blanks is regulated by an adjustable stop-bar, and when reaching the latter the blanks are cut from the entered-bar ends by vertically-operated blades. After being cut the blanks fall by gravity into grooves formed in the upper surface of a table or platen, wherein they are moved to enter the dies $d^2$ on coming into position at each quarter-turn of the die-wheel.

The mechanism by which the rods are moved and the blanks cut and caused to enter the shaping-dies is described as follows:

The letters $V'$ and $V^2$ designate two feeding-rollers, the upper one of which (indicated at $V'$) is mounted eccentrically upon its shaft $v^3$, with the lower roller $V^2$ mounted concentrically upon its shaft $v^4$ and operated to turn by traction with the upper roller. These rollers are perimetrically grooved in vertical alinement at $g'$, and the upper feed-roller receives power from a sprocket-wheel $v^5$, arranged on the same shaft, and a sprocket-chain belt $v^6$ running upon a sprocket-wheel on the shaft $S^2$ and upon the sprocket-wheel $v^5$. The feed-roller $V'$ runs continuously when the machine is being operated, but the roller $V^2$ only runs when actuated by its traction with the other roller.

The letter G designates a gage arranged to regulate the length at which the blanks shall be cut from the entered rods.

The letter $g^4$ designates a vertically-placed plate, against the outer face of which the entered ends of the rods will abut when being cut into blank lengths. This vertically-placed plate $g^4$ is made adjustable as to its distance from the cutting or shearing blades by being movable outwardly and inwardly upon the rods $g^5$, of which there are two, but of which only one is shown. This plate $g^4$, as adjusted on the rods $g^5$, is held by nuts $g^8$, of which there is one threaded into each of the rods $g^4$ at each side of the gage-plate.

The letters $C^4$ and $C^5$ designate the cutting or shearing blades, both of which are arranged at the front of the machine and by which the blanks are cut from the entered rods. The blade $C^4$ is stationary, and the upper blade $C^5$ is arranged to be moved vertically upon slides $S^9$, of which but a part is shown at Fig. 10, and when said blade $C^5$ is moved downwardly it is thus operated against the force of springs $S^5$, of which there is one arranged beneath each of its ends. The stationary blade $C^4$ has openings $m'$ for the lateral passage of the rods $r^6$ from which the blanks are cut, and the shearing-blade $C^5$ has semicircular and inwardly-tapering recesses $m^2$ formed on its lower edge to be vertically in line with the passages $m'$ of the stationary blade, as shown at Figs. 10 and 11. To operate these blades, the following mechanism is used:

The letter $R^3$ designates a rock-shaft, which is arranged to journal at each of its ends in the machine-housing, and the letters $A^2$ designate a tappet-arm, which at one of its ends is keyed to the rock-shaft $R^3$.

The letter M designates a tappet-wheel arranged upon the die-wheel shaft between the die-wheel and the time-ring thereon, said tappet-wheel having four tappets $T^4$, that are diametrically and oppositely located thereon.

The letters $N^2$ designate arms, of which there is one at each end of the rack-shaft $R^3$, keyed to the latter to be operated by it to engage with and bear down upon the blade $C^5$, and thus cause it to descend and make a shearing engagement with the blade $C^4$, and when the engagement between the tappets and the tappet-arm ceases the springs $S^5$ will become active to move upwardly the shearing-blade $C^5$. This tappet-wheel M is indicated by a dotted line at Figs. 2 and 3 and in edge elevation at Fig. 1.

To deliver the blanks after having been cut, as before described, and to have them enter the dies $d^2$ by which they are shaped, the following mechanism is employed:

The letter $L^2$ designates a crank-arm, which at $p^6$ is keyed to the rock-shaft $R^4$, with the latter arranged to journal in the frame part $e'$ $e'$, with the lower end of this lever $L^2$ (when extending below its connection to the rock-shaft) attached to the outer end of the spring $S^6$, the latter having its inner end connected to the base U.

The letters $n$ $n$ designate arms, which at their lower ends $n^2$ are each keyed to the rock-shaft $R^4$, so as to move with it, and at their upper ends each of these arms is forked at $n^4$ to receive a horizontally-arranged bar $n^5$, to which latter there are connected and horizontally projected inwardly four plungers $n^6$. This bar $n^5$ is provided with a guide-rod $n^7$ at each of its ends, having a slideway in which to move and steady the movement of the bar $n^5$ and the plungers $n^6$.

The letters $P^3$ designate a horizontally-arranged platen or table having in its upper surface four grooves $n^8$, with the latter arranged to be horizontally in line with the plungers $n^6$ and the dies $d^2$ as a series of the latter are brought into position by the operation of the die-wheel, as will be detailed hereinafter. These platen-grooves are shown at Fig. 18.

The letters $K^3$ designate a wiper-cam arranged upon the inner face of the sprocket-wheel $v^6$, and in such a position thereon that it will at each revolution of said sprocket-wheel engage with the upper end $l^7$ of crank-arm $L^2$ and cause the latter to partially rotate the rock-shaft $R^4$. When the latter is thus moved, it will operate the arms $n$ $n$ and connected bar $n^4$ to actuate the plungers, and thus force the blanks lying in the platen-grooves $g^8$ to enter that series of the dies $d^2$ which are in a position to receive them. When the engagement between the wiper-cam and the crank-arm $L^2$ ceases, the spring $S^6$ becomes active to give to the rock-shaft a reverse movement in partial rotation, whereby the plungers are drawn outwardly from the grooves of the platen.

There is arranged to engage with the outer face of the dies $d^2$ when each series of the latter are at the under side of the die-wheel a series of rivet-ejectors, (designated at $t^5$,) and the function of these ejectors is to engage with and pull from the die in which held any rivet that has not been removed from the dies by the operation of the pins $p^3$ before coming under the action of the ejectors. These latter are operated as follows:

The letters $h^4$ designate a bar that is connected to and outwardly projected from the rock-shaft $R^4$, so as to move with the latter, said bar having formed on its upper face the cam-surface $h^5$.

The letters $t^5$ designate an ejecting-lever connected to a horizontal shaft $t^6$, that is journaled in the machine-base, there being four such ejectors arranged upon said shaft $t^6$ to be together actuated thereby, and each of said ejectors is arranged to be vertically in line with one of the dies $d^2$ when each of the latter as one of a series is on the under side of the die-wheel. The inner end of each of these ejectors is forked at $t^8$, so that when the inner end of the ejectors is raised it will engage with and remove any blank remaining in the dies $d^2$ by the downward movement of the forked end of the ejector as the outer end of the latter is raised by the cam $h^5$.

The die-wheel is actuated with four alternating periods of motion and rest at each complete revolution by means of the following mechanism:

The letter $D^3$ designates a crank-disk which is arranged upon and keyed to the shaft $S^2$ when extending beyond the housing H.

The letter $P^4$ designates a pitman which at its upper end is made to journal upon a wrist-pin $p^6$, projected from the crank-disk $D^3$, with the lower end of this pitman entered between and pivoted at $p^8$ to the forked arms $p^9$ of the spring-pawl bar $B^3$. (Shown as detached at Fig. 7.) This spring-pawl bar at its lower end is journaled on so as to freely turn with the end of the die-wheel shaft where projecting beyond the housing H.

The letters $M^3$ designate a ratchet-wheel which is arranged to turn on the die-wheel shaft, and this ratchet-wheel has upon its outer side face the ratchet-bevels $m^5$, terminating in stops $m^6$, and on the inner edge of its perimeter provided with the recesses $m^7$, having the stops $m^8$, as shown at Figs. 2 and 8 by dotted lines and full lines at Fig. 9.

The letters $m^4$ designate a spring-pawl arranged within a cap $k^5$, secured to the exterior of the pawl-bar $B^3$ and having a spiral spring $k^6$ encircling the outer end of the pawl-pin where within the cap on the cap side of the collar $k^7$. The inner end of the pawl where passing through the bar $B^3$ is arranged to run on the bevels of the ratchet-wheel $M^3$ to engage with stops thereon, so that the ratchet-wheel will move a quarter of a turn at each complete revolution of the shaft $S^2$.

The letter Y designates a stop-pawl or detent which at its upper end is pivoted to a stud $y^2$, projected outwardly from the housing and at its lower end $y^3$ provided with a latch-form end adapted to engage with one of the stops $m^6$ to prevent any back movement of the ratchet when coming to a rest.

The letters $y^4$ designate a spring by which the detent end of the stop-pawl Y is kept in contact with the rim of the ratchet-wheel.

The letter Z designates another detent-pawl which is pivoted to the stud $y^2$ back of the stop-pawl Y, and this detent Z has a latch-form lower end $z^2$ and is provided with a spring $z^3$, by which its latch-form end is forced to contact with the perimeter of the ratchet-wheel, where there are located the recesses $m^7$ and stops $m^8$ to thus prevent the ratchet-wheel from making an advance movement after coming to a period of rest.

The letter Q designates a rider which is connected to the bar $B^3$, as shown at Fig. 2, and its function is to bear on the perimeter of the ratchet-wheel when moving, and thus prevent the detent Y from entering the recesses $m^7$ when passing.

The letters $T^5$ designate a time-wheel, which is illustrated in position upon the machine at Fig. 1 and as connected to the ratchet-wheel at Figs. 8 and 9. This time-wheel is keyed to the die-wheel shaft $S^3$, and it connects with the inner face of the ratchet-wheel by means of a projection $u$ on the inner face of the latter, two lugs $u^2$ $u^2$, of which latter there is one projected from the rim of the time-wheel, so as to be on each of the opposite sides of the projection $u$, and a set-screw $u^3$, of which there is one threaded into each of the lugs $u^2$, so that the inner end of the set-screws will engage with and bear upon one of the opposite sides of the projection $u$. As thus connected to the die-wheel shaft $S^3$ the time ring or wheel is adapted to be adjustably connected to the ratchet-wheel, and thus regulate the time at which the regular alternating periods of quarterly rotation and intermediate periods of rest shall occur with relation to the operation of the header, the shearing mechanism, and the rivet-ejecting mechanism.

The operation of the mechanism thus illustrated and described is as follows: The rods from which the rivets are to be made when heated are caused to enter the grooves formed in the perimeters of the rolls designated at $V'$ and $V^2$, with the eccentric face of the upper roller coöperating with the lower feed-roll to move the rods inwardly until their inner ends abut against the gage-plate G. When this has been done, the blade $C^5$ is operated to descend and make a shearing engagement with the stationary blade $C^4$, and thus cut the blanks from the entered ends of the rods. These blanks after being cut each descend, so as to enter one of the grooves $n^8$ of the platen $P^3$, where they are each operated upon by one of the horizontally-moving plungers (designated at $n^6$) to enter one of the dies $d^2$ of that series of the latter which has been brought into position by the movement of the die-wheel. This having been done, the die-wheel makes progressively another quarter of a revolution, with a succeeding period of rest, with the dies $d^2$, which had been supplied with blanks brought into position beneath the header A and header-dies $a^5$. While thus placed and at rest the cam-pin $k^2$, arranged upon the shaft $S^2$, by the movement of the latter trips the header from its locked position as held by the pin $J^2$, thus releasing the header for it to descend by gravity, with its dies engaging with the blanks to force them into position within the dies $d^2$ of the die-wheel. After the foregoing has been accomplished and before the die-wheel again moves the cam $K'$ upon the shaft $S^2$ comes in contact with the top of the header to force the latter downwardly, and thus cause the header-dies to swage the heads of the blanks and to finish their shape within the die-wheel dies by pressure. Immediately succeeding this movement of the header and header-dies they are immediately raised, and the dies holding the finished rivets are by the succeeding movements of the die-wheel carried downwardly and rearwardly, while another set of blanks and dies come into position under the header to be operated upon as before. When being carried downwardly rearwardly the ends of the bar B come in contact with the cam $C'$, by which the pins $p^3$ on said bar and the latter are moved outwardly, thus forcing the finished rivets from the dies, and before the latter and the die-wheel come into a position whereat blanks may be again supplied to the thus-emptied dies the bar B comes in contact with the cam $C^2$, whereby the pins $p^3$ are again placed in position to support the inner ends of the blanks.

While I have shown the mechanism which cuts the blanks from the heated rods as operated connectedly with the die-wheel, if desired the blanks can be cut by other mechanism and as heated supplied to the platen-grooves to be forced into the dies of the die-wheel on coming into position to receive them.

By making the die-wheel dies each in two parts and with encircling spaces between the shoulders of the die parts and the sinks in which the latter are placed the dies are made better adjustable to receive the entering blanks, and by having the encircling spaces between the dies and the sinks the dies have provision made for their expansion by heat.

Having thus described my invention, what I claim, and desire to secure by Letters Patent, is—

1. In a machine for making rivets, the combination with a die-wheel mounted upon a shaft and having recesses in its perimeter, and provided with means to be operated with alternating periods of rotation and rest substantially as described; of a stock mounted in each of said recesses; sinks arranged in each of said stocks; a two-part die arranged in each of said sinks; a header provided with header-dies and operated to descend by gravity upon blanks in said die-wheel dies when the latter are at rest beneath the header; and means whereby said header immediately after its descent is operated to bear upon and swage said blanks, and then to rise from off them substantially as shown and described.

2. The combination with a die-wheel mounted upon a shaft, and having means to be operated with alternating periods of rotation and rest, substantially as described, and provided with dies arranged in series in its perimeter; of a header arranged in slideways above the die-wheel and provided with header-dies, with the latter and the header operated to descend by gravity upon blanks in the dies of the die-wheel, when the latter is at rest beneath the header; and means substantially as described whereby pressure is applied to said header and header-dies after their descent upon the blanks to thus swage the heads and shape the rivets, with said header and dies operated to rise before the die-wheel commences to again move, substantially as shown and described.

3. The combination with a die-wheel mounted upon a shaft and having means to be operated with alternating periods of rotation and rest substantially as described, and provided with dies arranged in series in its perimeter; of a header arranged in slideways above the die-wheel and provided with header-dies each having a concave recess in its under surface, and which recess at its lower circular edge is adapted to make a shearing engagement with the circular outer face of the top of that one of the die-wheel dies with which it engages; with said header and header-dies operated to descend by gravity upon the blanks in the dies of the die-wheel when the latter is at rest beneath the header; and means substantially as described whereby pressure is applied to said header and header-dies after their descent upon the blanks to thus swage their heads and shape the rivets, and with said header operated to rise before the die-wheel commences to again move substantially as shown and described.

4. In a machine for making rivets the combination with a die-wheel mounted upon a shaft, and provided with means to be actuated with alternating periods of rotation and rest; of recesses formed in the perimeter of said die-wheel; a stock in each of said recesses; a series of sinks formed in each of said stocks each having two encircling shoulders; a two-part die arranged in each of said sinks with each of said die parts having formed thereon an exteriorly-encircling shoulder where circumferentially opposite to the adjacent shoulder of the sink in which the die part is placed, to thereat inclose a space between the dies and the sinks; and a header having a header-die and provided with means to be operated substantially as, and for the purposes set forth.

5. In a machine for making rivets the combination with a die-wheel mounted upon a shaft, and provided with means whereby to be actuated with alternating periods of rotation and rest, of dies mounted in series in the perimeter of said die-wheel at diametrically-opposite points; a horizontally-arranged platen provided with grooves in its upper surface adapted to receive blanks; and plungers operated to move in said grooves to force blanks therein into the die-wheel dies when each series of the latter come to a period of rest horizontally in line with said grooves, substantially as and for the purposes set forth.

6. In a machine for making rivets the combination with a die-wheel mounted upon a shaft, of means whereby said die-wheel may be actuated with alternating periods of rotation and rest; dies mounted in series in the perimeter of said wheel, at diametrically-opposite points; a horizontally-arranged platen provided with grooves in its upper surface; rolls adapted to move inwardly the rods from which the blanks are to be cut at each time the die-wheel comes to a period of rest; a gage against which the entered rods will abut; a shearing mechanism whereby the blanks will be cut from the rods to descend into the platen-grooves; and plungers operated to force the blanks to enter the die-wheel dies when at rest, substantially as shown and described.

7. In a machine for making rivets, the combination with shank-forming dies, of heading-dies each having a concave recess in its swaging-face, and operated by gravity; and in immediate sequence thereto to swage the heads of the blanks and finish their shape within the die-wheel dies by pressure, substantially as shown and described.

8. In a machine for making rivets, the combination with a die-wheel mounted upon a shaft, and provided with means to be actuated with alternating periods of rotation and rest substantially as described; of rivet-shank-forming dies arranged in series in the perimeter of the die-wheel; a header having slideways in the housing above the die-wheel, and provided with header-dies upon its under surface; latching mechanism connecting said header to the housing when raised; and means substantially as described whereby said latching mechanism may be tripped, and the header actuated to descend by gravity, with its dies engaging with the blanks in the die-wheel dies when at rest beneath the header, with the latter immediately after its descent actuated by swaging pressure, and then caused to rise, and be again latched automatically, substantially as, and for the purposes set forth.

Signed at the city of Troy, New York, this 16th day of February, 1899, in the presence of the two witnesses whose names are hereto written.

FRANK DANKS.

Witnesses:
   GEO. M. PAYFER,
   W. E. HOGAN.